C. W. SAPPENFIELD.
Bee-Hive.
No. 221,425. Patented Nov. 11, 1879.
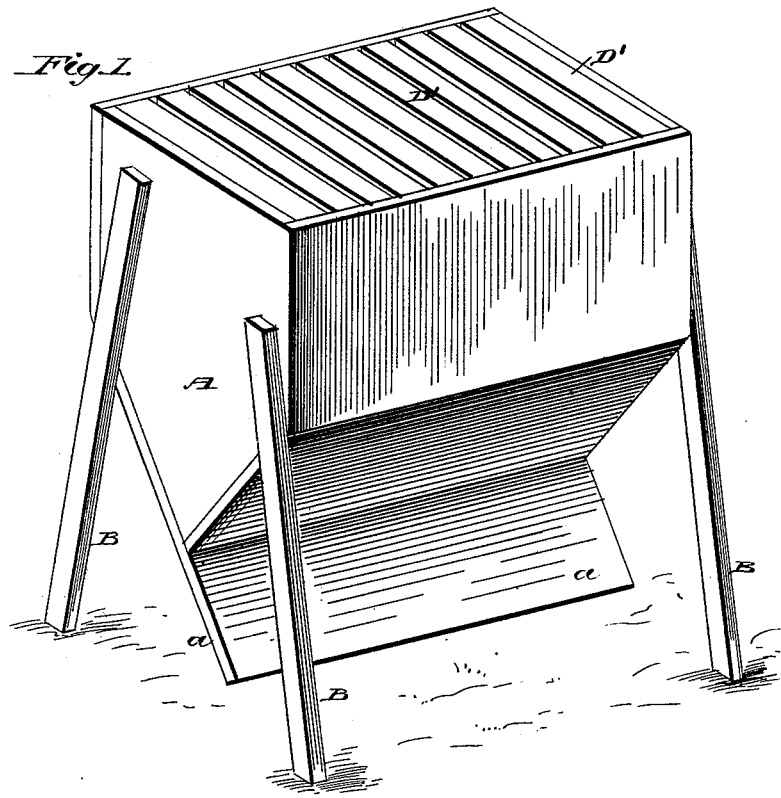
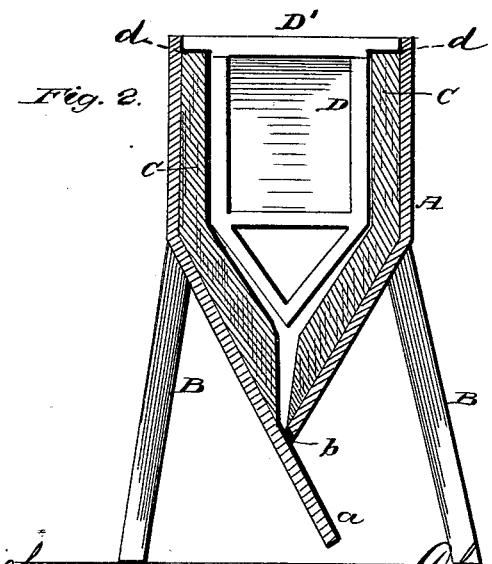

UNITED STATES PATENT OFFICE.

CHARLES W. SAPPENFIELD, OF CRAWFORDSVILLE, INDIANA.

IMPROVEMENT IN BEE-HIVES.

Specification forming part of Letters Patent No. 221,425, dated November 11, 1879; application filed January 20, 1879.

*To all whom it may concern:*

Be it known that I, CHARLES W. SAPPENFIELD, of Crawfordsville, in the county of Montgomery and State of Indiana, have invented certain new and useful Improvements in Bee-Hives; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved bee-hive, and Fig. 2 is a vertical section of the same.

Corresponding parts in the two figures are denoted by like letters.

This invention relates to certain improvements in bee-hives, the object of which is to effect the absorption of the moisture in the hives, heretofore so detrimental to the existence of the bees; and it consists in constructing the walls of the house or body of the hive of wood, with an inner porous lining of plaster-of-paris mixed with sand, which said lining is so arranged relative to its outer wooden casing as to form a ledge or shoulder for the support of the comb-frames, substantially as hereinafter more fully set forth.

In the drawings, A refers to the body or house of the hive, about the upper half of which is of a rectangular shape, while the remaining lower portion tapers downwardly to a wedge-line, from whence one side of the house is further extended, as shown at $a$, to a point within convenient distance of the ground.

The board $a$ serves as the alighting-platform for the bees, which pass therefrom into the hive through the bee-entrance $b$, while the difficulty of ascent up the same will baffle the attempts of the moth to gain an entrance.

The house A is supported upon the legs B, secured thereto in any suitable manner.

C is a lining composed of an equal or unequal number of parts of plaster-of-paris and sand, which is mixed with water and applied to the interior of the house or hive in a plastic state, to absorb all moisture, so detrimental to the life of the bees, especially during the winter season.

D is one of a series of comb-frames hung in the chamber of the hive, with its upper bar resting upon the upper edges of the wall or lining C, which does not reach to the top of the outer casing, A, but forms a ledge or shoulder, $d$, of a width corresponding to the thickness of the lining, upon which rest the ends of the upper cross-pieces, D′, of the comb-frames, as shown in Fig. 2.

I am aware that bee-hives have been constructed with hollow walls forming dead-air chambers, which have been lined with paper, for the purpose of checking the passage of heat and moisture into the hive; but the absorbent being placed within these dead-air chambers, and with a non-absorbing lining or wall between it and the interior of the hive, it will not readily absorb the moisture engendered within the hive by "sweating," or which may penetrate into it through the openings for affording ventilation and ingress of the bees.

I am also aware that plaster-of-paris, owing to its qualities as an absorbent of moisture and a non-conductor of heat, has been used for the inner linings of bee-hives, and also been cast in sections as a lining for refrigerators; hence I do not claim, broadly, a bee-hive constructed with a lining of this material; but,

Having thus described my improvement, I claim and desire to secure by Letters Patent of the United States—

As an improvement in bee-hives, the outer wooden casing, A, of the described construction and configuration, provided with an inner porous lining, C, forming, with said outer casing, A, a ledge or shoulder, $d$, for the support of the comb-frames, substantially as set forth.

In testimony that I claim the foregoing as my own I have hereunto affixed my signature in presence of two witnesses.

CHAS. W. SAPPENFIELD.

Witnesses:
 MELVILLE W. BRUNER,
 HENRY W. CONNARD.